United States Patent
Wang et al.

(10) Patent No.: US 6,853,353 B2
(45) Date of Patent: Feb. 8, 2005

(54) ANTENNA ASSEMBLY FOR USE WITH A PORTABLE COMPUTING DEVICE WIRELESS COMMUNICATION

(75) Inventors: Chun-Chieh Wang, Zhang Hua (TW); Shih-Ying Lin, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 2 days.

(21) Appl. No.: 10/292,611

(22) Filed: Nov. 12, 2002

(65) Prior Publication Data

US 2004/0090383 A1 May 13, 2004

(51) Int. Cl.$^7$ .............................. H01Q 1/10; H04B 1/38
(52) U.S. Cl. ....................... 343/901; 343/900; 343/883; 343/882; 455/575.4; 455/575.3
(58) Field of Search ................................. 434/883, 882, 434/881, 880, 889, 900, 901; 455/575.4, 575.3, 575.1; 343/889, 888, 901, 903, 900, 882, 883, 881

(56) References Cited

U.S. PATENT DOCUMENTS

| | | | | |
|---|---|---|---|---|
| 5,684,672 A | * | 11/1997 | Karidis et al. .............. 361/683 |
| 5,949,379 A | * | 9/1999 | Yang ........................... 343/702 |
| 6,359,591 B1 | * | 3/2002 | Mou ........................... 343/702 |
| 6,573,868 B2 | * | 6/2003 | Johnson et al. ............. 343/702 |
| 2002/0118135 A1 | * | 8/2002 | Johnson et al. ............. 343/702 |

* cited by examiner

Primary Examiner—Tuyet Thi Vo
(74) Attorney, Agent, or Firm—Thomas, Kayden, Horstemeyer & Risley

(57) ABSTRACT

An antenna assembly for a wireless communication equipment of the invention comprises a fastening base that is fixedly connected to one side of the wireless communication equipment. An arm, retractable and deployable, has a first end that is movably connected to the fastening base in a manner that the arm, retractable and deployable, is capable of retracting close to the side of the wireless communication equipment and deploying away from the side of the wireless communication equipment. An antenna stem is pivotally connected to a second end of the arm, retractable and deployable. The pivotal connection between the antenna stem and the arm is such that a directional orientation of the antenna stem relative to the axis of the arm is adjustable by rotation for obtaining optimal transmission and reception.

9 Claims, 7 Drawing Sheets

ANTENNA ASSEMBLY FOR USE WITH A PORTABLE COMPUTING DEVICE WIRELESS COMMUNICATION

BACKGROUND OF THE INVENTION

1. Field of the Invention

The invention relates to a retractable and deployable antenna assembly and, more particularly, to a retractable and deployable antenna assembly for use with a portable computing device in wireless communication.

2. Description of the Related Art

The wireless technology becomes increasingly more popular, being currently implemented in diversified types of products such as a wireless computer keyboard, a wireless computer mouse, a portable computer, etc. A wireless transmission is advantageous for the reason that it does not necessitate connection cables, which facilitates the portability of the wireless communication equipment and makes its use very convenient. However, when wireless transmission is implemented, an important consideration is the installation of the antenna. An inadequate design or installation of the antenna usually constitutes an obstacle to a proper transmission and reception of information data. Generally, a rod-type antenna having its axis upwardly oriented provides better transmission and reception characteristics than dish-type antenna.

Referring to FIG. 1, a portable computer 10 that implements wireless communication usually needs the installation of a rod-type antenna 12 that is connected to the MODEM or the PCMCIA (Personal Computer Memory Card International Association) card of the computer. Due to this necessary connection, the antenna therefore is usually mounted at a lateral side of the portable computer. When wireless communication is performed, the antenna 12 has to be erected upward to obtain optimal transmission and reception characteristics. As a result, while typing on the keyboard, the user's hands 14 may involuntarily touch the antenna 12. Manual typing on the keyboard therefore is inconvenient and, furthermore, repeatedly touching the antenna 12 may cause loosening of its connection and even the damage of the antenna 12. Additionally, the conventional assembly of the antenna 12 usually does not allow a convenient arrangement, and the antenna 12 often forms a protruded shape over the portable computer that usually has a planar and smooth contour. With the antenna mounted thereon, the portable computer therefore cannot be conveniently placed in a computer bag. As a result, the antenna is conventionally constructed as an external component that is mounted to the portable computer only when it is needed. If the portable computer has to be placed in a bag, the antenna has to be dismounted.

SUMMARY OF THE INVENTION

It is therefore a principal object of the invention to provide a retractable and deployable antenna assembly for use with a portable computing device in wireless communication that can solve the above problems of the prior art.

To attain the above and other objectives, an antenna assembly for use with a portable computing device in wireless communication of the invention comprises a fastening base that is connected to one side of the portable computing device. An arm, retractable and deployable, has a first end that is movably connected to the fastening base in a manner that the arm is capable of retracting close to the side of the portable computing device and deploying away from the side of the portable computing device. An antenna stem is pivotally connected to a second end of the arm. The pivotal connection between the antenna stem and the arm is such that a directional orientation of the antenna stem relative to the axis of the arm is adjustable by rotation for obtaining optimal transmission and reception. A metallic wire further runs respectively along the fastening base, the arm, and the antenna stem for conducting electromagnetic waves.

According to a first embodiment, the arm, retractable and deployable, is a telescopic arm formed by an assembly of a plurality of telescopic tubes. The antenna stem further is connected to the telescopic arm via a connecting rod that pivotally engages with the second end of the telescopic arm.

According to a second embodiment, the antenna stem is connected to the telescopic arm via a rotary connection that allows a rotation of the antenna stem in a plane containing the axis of the telescopic arm.

According to a third embodiment, a spring is further mounted within the telescopic arm. A mounting region of the fastening base with the telescopic arm is further provided with a guide groove to which corresponds a projection on the outer surface of the telescopic arm. Thereby, once the projection of the telescopic arm, being telescopically retracted, is within the guide groove, an axial rotation of the telescopic arm locks the telescopic arm in the retracted configuration. To deploy the antenna assembly, the telescopic arm is reversely rotated to have the projection located in the guide groove. The spring thereby can resiliently pushes out and deploys the telescopic arm and the antenna stem.

According to a fourth embodiment, a traversal stem that is pivotally connected to the fastening base. The traversal stem is pivotally connected to the antenna rod. Additionally, the rotation axis of the pivotal connection between the antenna rod and the traversal stem is inclined in respect of the rotation axis of the pivotal connection between the traversal stem and the fastening base. Thereby, the antenna rod is foldable over the axis of the traversal stem that, further, is foldable in a manner to be closely parallel to the lateral side of the portable computing device.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
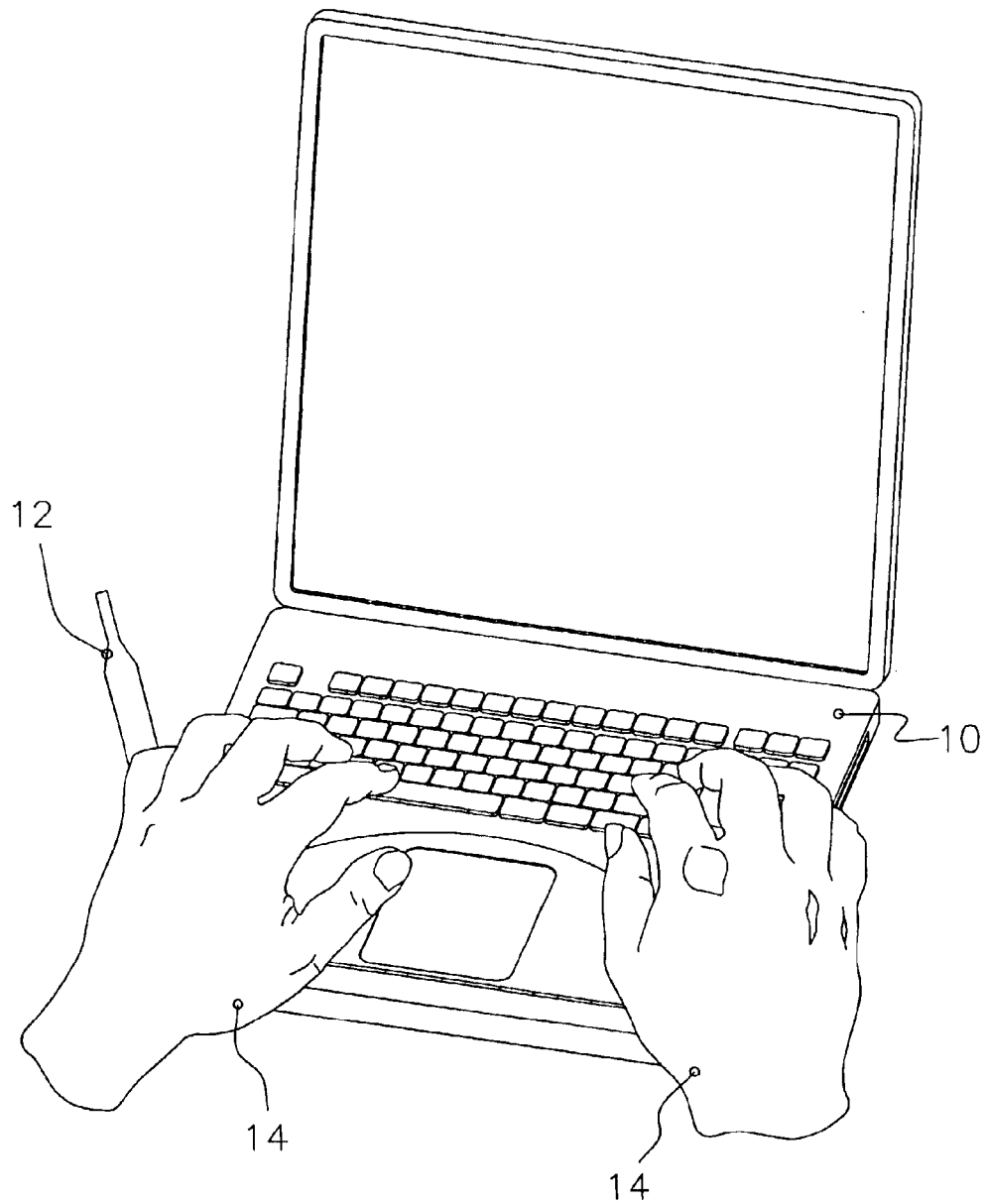
FIG. 1 is a schematic view illustrating a conventional mount of an antenna on a portable computer.

Wherever possible in the following description, like reference numerals will refer to like elements and parts unless otherwise illustrated.

An aspect of the invention is to provide an antenna assembly having an antenna stem that can be directionally oriented to obtain optimal wireless transmission and reception. Furthermore, the antenna assembly of the invention can be conveniently retracted close to the portable computing device.

Figure 2A:
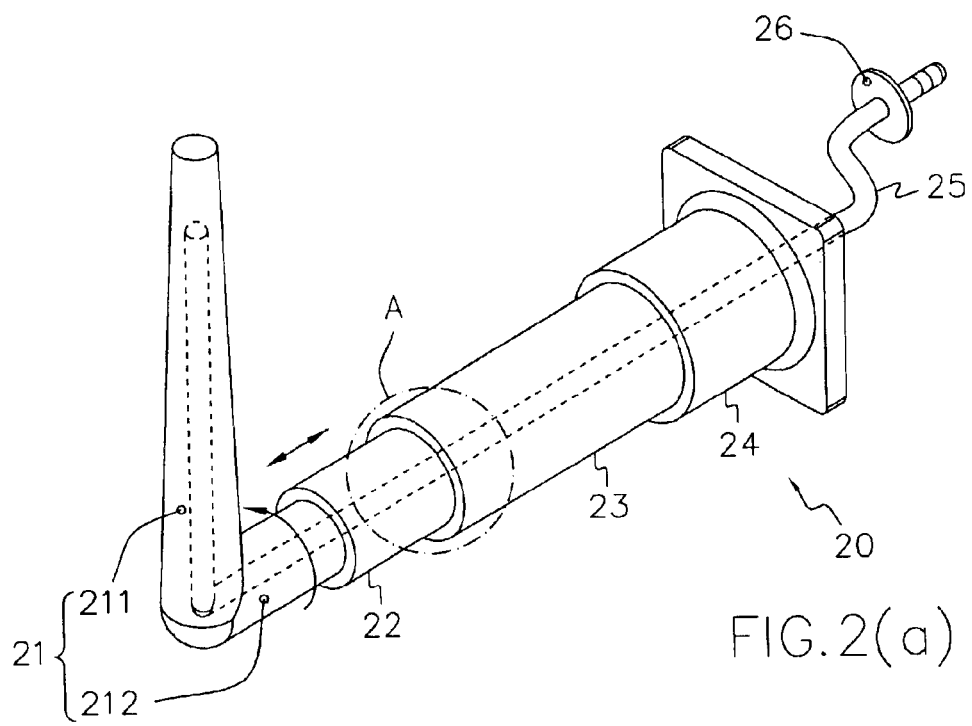
FIG. 2(a) is a schematic view particularly illustrating an antenna assembly for use with a portable computing device in wireless communication according to a first embodiment of the invention.
Figure 2B:
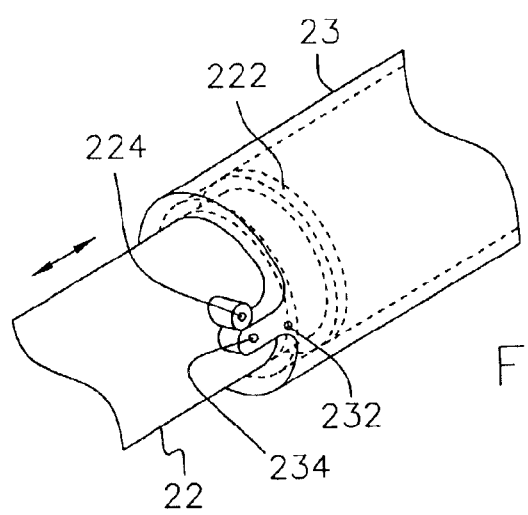
FIG. 2(b) is an enlarged view of the zone A of FIG. 2(a)

Referring to FIG. 2(a), a schematic view illustrates an antenna assembly for wireless communication equipment according to a first embodiment of the invention. The antenna assembly 20 comprises an L-shaped antenna end portion 21, a telescopic arm comprised of first and second telescopic tubes 22, 23, a fastening base 24, a metallic wire 25, and a fastening screw 26. In FIG. 2(a), the dotted line illustrates the metallic wire 25 that runs respectively along the L-shaped antenna end portion 21, the first and second tubes 22, 23, and the fastening base 24 for transmitting and receiving electromagnetic waves. The fastening screw 26 is attached to an end of the metallic wire 25 for electrically connecting to a wireless network card such as a PCMCIA card. The antenna end portion 21 comprises an antenna stem 211 connected to a connecting rod 212 that telescopically and pivotally engages with the first tube 22. The first tube 22 telescopically engages with the second tube 23 that, in turn, telescopically engages with the fastening base 24. Via the above mount is thereby constructed a retractable arm. An outer radius of the first tube 22 is slightly smaller than an inner radius of the second tube 23 so that the first and second tubes 22, 23 can slide and rotate relative to each other. The metallic wire 25 of the prevent invention can be replaced by any conductive material other than metal. FIG. 2(b) is an enlarged view of the zone A in FIG. 2(a). As illustrated, an outer annular flange 222 outwardly protrudes from an outer surface of the first tube 22, while an inner annular flange 232 inwardly protrudes from an inner surface of the second tube 23. The abutment of the flanges 222, 232 against each other enables to limit the deployment of the first tube 22 relative to the second tube 23 and thereby prevents their separation. A rotation limiter is further formed on the first and second tubes 22, 23 to limit their relative rotation. As illustrated, the rotation limiter is constructed via, for example, the formation of corresponding abutment projections 224, 234 respectively on the first and second tubes 22, 23 that abut against each other when both tubes rotate a certain angle relative to each other. Similar dispositions may be also provided between the connecting rod 212 and the first tube 22 and between the second tube 23 and the fastening base 24. Via the pivotal connection of the connecting rod 212 with the telescopic arm, the antenna stem 211 can be thereby directionally adjusted to orient upward for better transmission and reception.

Figure 2C:
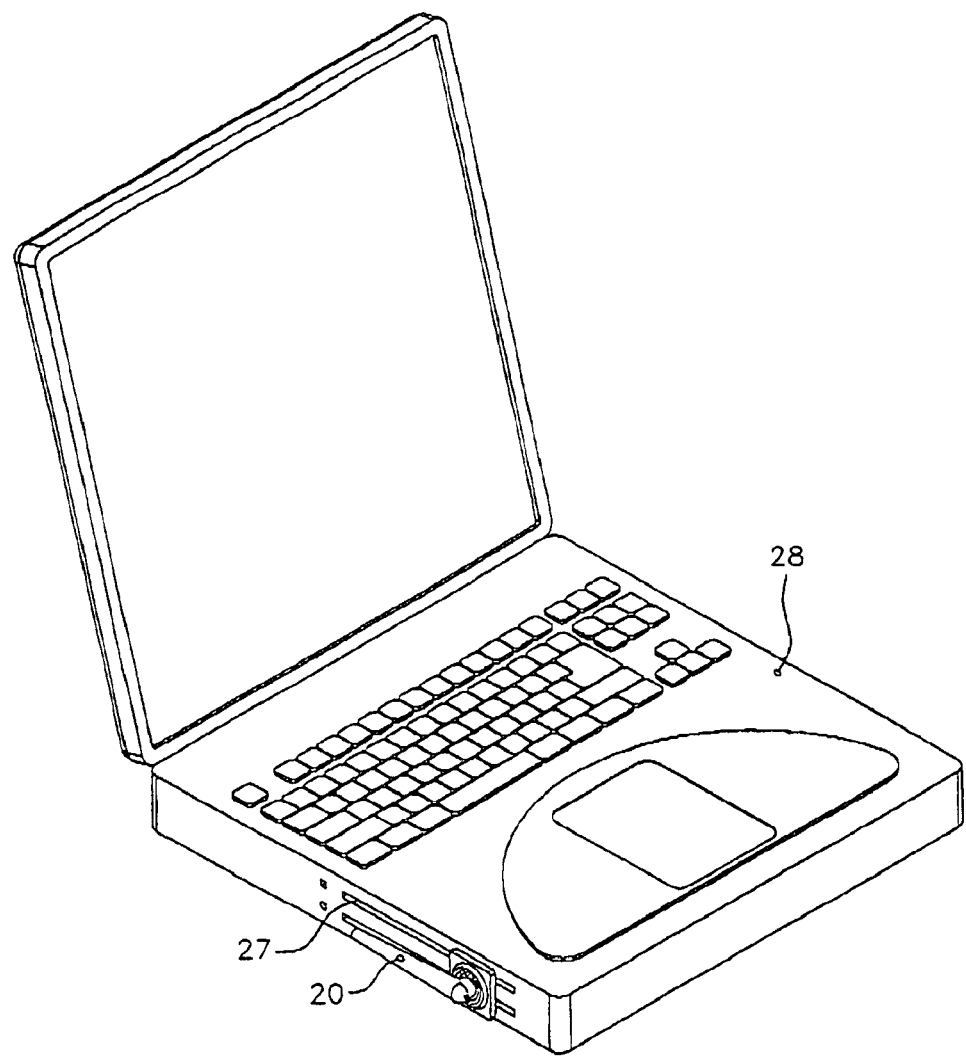
FIG. 2(c) and FIG. 2(d) are perspective views illustrating an implementation of the antenna assembly of the invention mounted on a portable computer according to the first embodiment of the invention.

Referring to FIG. 2(c), the antenna assembly 20, formed as described above, may be mounted on, for example, a wireless network card or a PCMCIA card 27 of a portable computer 28. When no wireless transmission or reception is performed, the telescopic arm is compactly retracted, and the antenna end portion 21 is rotated to lie horizontally. The antenna assembly 20 thereby does not protrude over the keyboard surface and is arranged parallel close to a lateral side of the portable computer 28. The portable computer 28 therefore can be conveniently placed in a computer bag, and typing on the keyboard is not hampered by the antenna assembly.

Figure 2D:
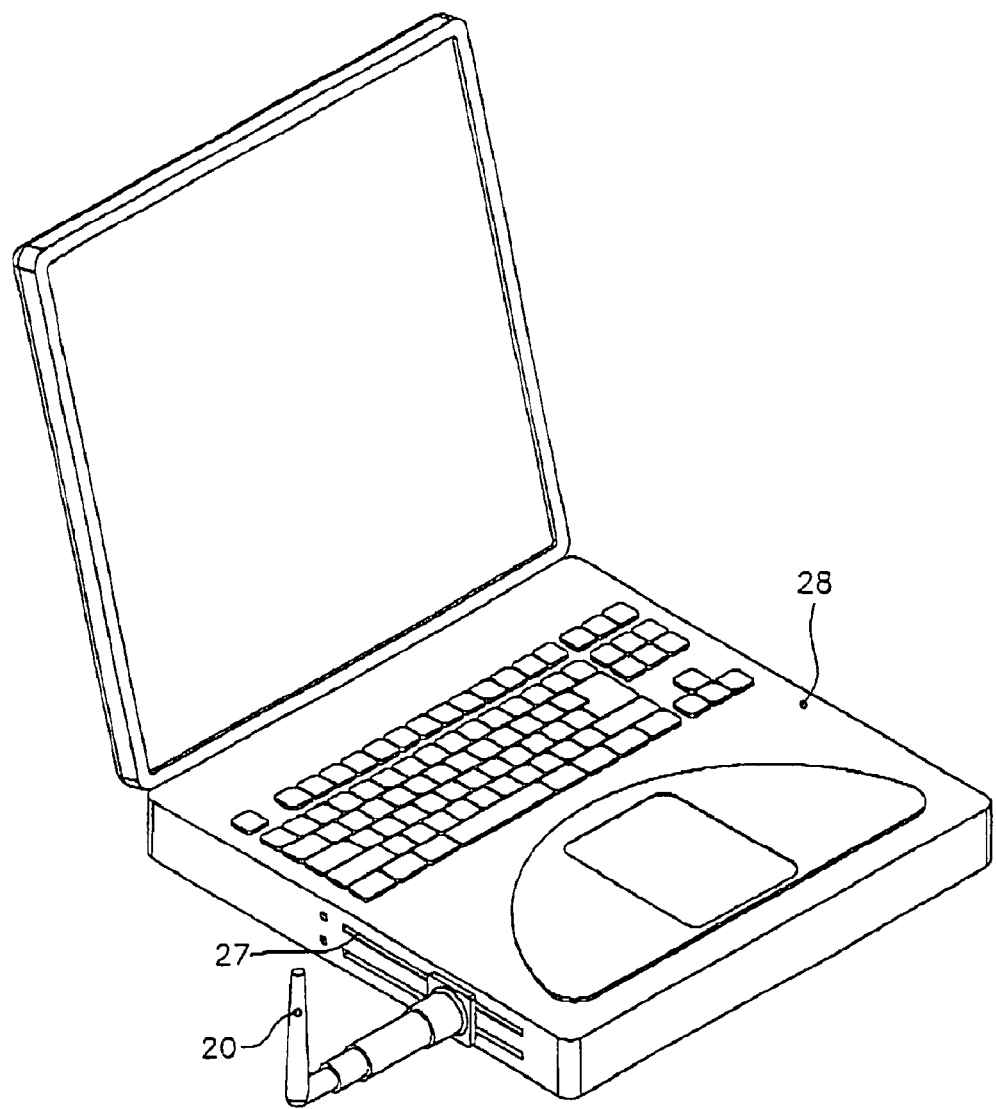

Referring to FIG. 2(d), when wireless transmission or reception is to be performed, the antenna end portion 20 is rotated in a manner that its stem 211 is adequately oriented, and the telescopic arm is pulled out in length. The antenna end portion 20 is thereby spaced apart a sufficient distance from the lateral side of the portable computer 28 to allow a comfortable manipulation of the computer by the user.

Figure 3:
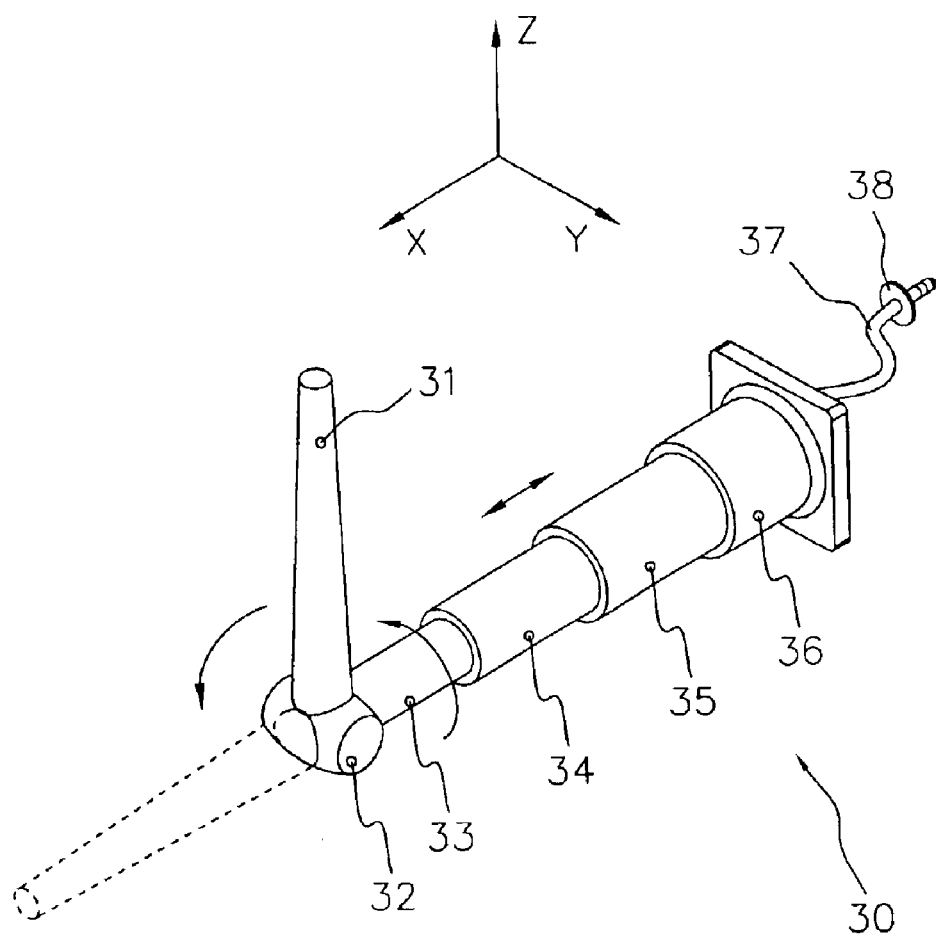
FIG. 3 is a schematic view illustrating an antenna assembly for use with a portable computing device in wireless communication according to a second embodiment of the invention.

Now referring to FIG. 3, a schematic view illustrates an antenna assembly for use with a portable computing device in wireless communication according to a second embodiment of the invention. In this second embodiment, the antenna assembly 30 includes an antenna stem 31, a rotary connection 32, a telescopic arm comprised of first, second, and third telescopic tubes 33, 34, 35 engaging with one another, a fastening base 36, a metallic wire 37 and a fastening screw 38. Similar to the previous embodiment, the telescopic arm formed by the tubes 33, 34, 35 can be retracted and deployed along a direction X, and the metallic wire 37 and fastening screw 38 are assembled for transmission and reception of electromagnetic waves to a wireless network card. Furthermore, the rotary connection 32 has a rotation axis Y around which the antenna stem 31 can rotate. This enables the antenna stem 31 to be adequately oriented for optimal transmission and reception.

Figure 4A:
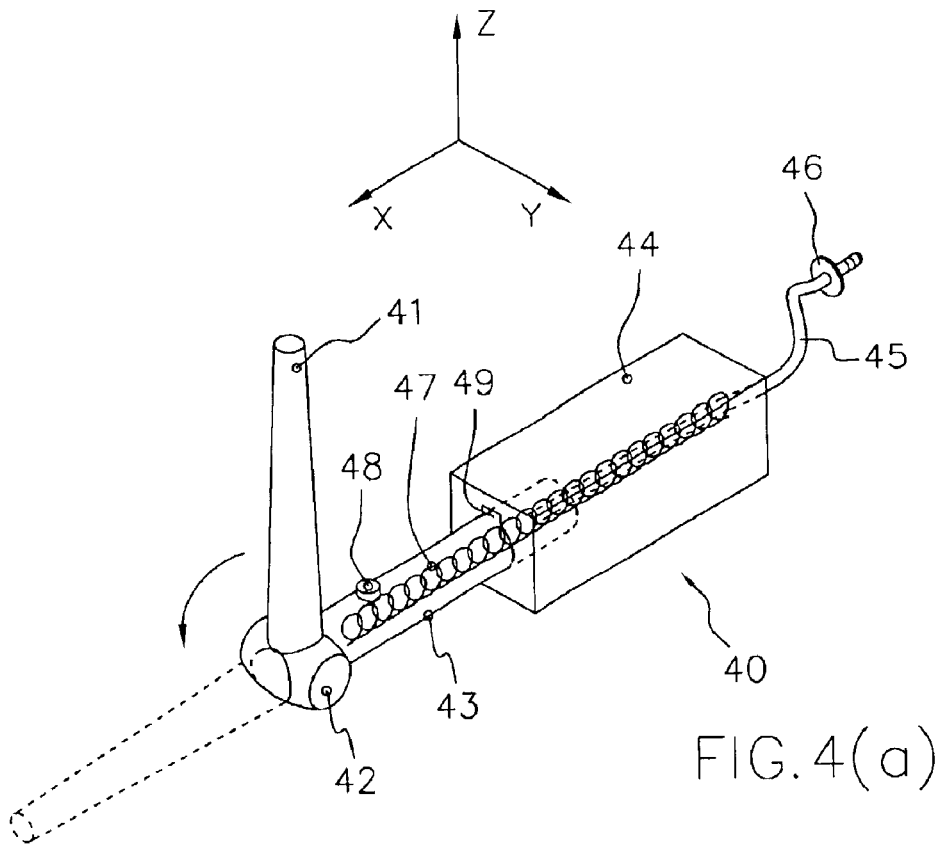
FIG. 4(a) and FIG. 4(b) are schematic views illustrating an antenna assembly for use with a portable computing device in wireless communication according to a third embodiment of the invention.
Figure 4B:
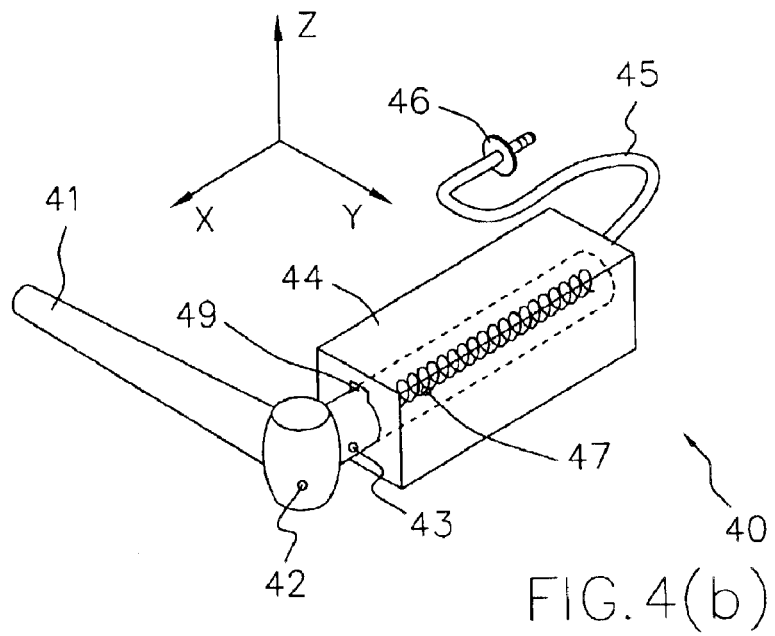

Referring to FIG. 4(a) and FIG. 4(b), two schematic views illustrate an antenna assembly for use with a portable computing device in wireless communication according to a third embodiment of the invention. FIG. 4(a) particularly illustrates the antenna assembly in a deployed configuration. As illustrated, the antenna assembly 40 of this embodiment comprises an antenna stem 41 that has one end pivotally connected through a rotary connection 42 to a telescopic tube 43. The telescopic tube 43 engages through a fastening base 44, and a metallic wire 45, attached to a fastening screw 46 at a distal end, runs through the telescopic tube 43 and antenna stem 41. A spring 47 is further mounted within the telescopic tube 43 and fastening base 44. A first end of the spring 47 is connected to the rotary connection 42 while a second end of the spring 47 is connected to an end of the fastening base 44. A projection 48 is formed on a surface of the front end of the telescopic tube 43, corresponding to a guide groove 49 formed on the fastening base 44. The size and shape of the guide groove 49 are adapted to allow the passage of the projection 48 of the telescopic tube 43.

Referring to FIG. 4(b), when no wireless transmission or reception is performed, the telescopic tube 43 is retracted until the projection 48 is located within the fastening base 44, which compresses the spring 47. The telescopic tube 43 and the antenna stem 41 then are rotated around the direction X (i.e. axis of the telescopic tube 43) until the antenna stem 41 lies horizontal. The orientation of the projection 48 relative to the guide groove 49 is thereby biased, which locks the antenna assembly 40 in the retracted configuration. When the antenna assembly 40 is to be deployed, the antenna stem 41 and telescopic tube 43 are reversely rotated until the projection corresponds to the guide groove 49. The resilient force accumulated by the spring 47 thereby can be released to deploy the telescopic tube 43, and the antenna assembly recovers its deployed configuration of FIG. 4(a).

Figure 5A:
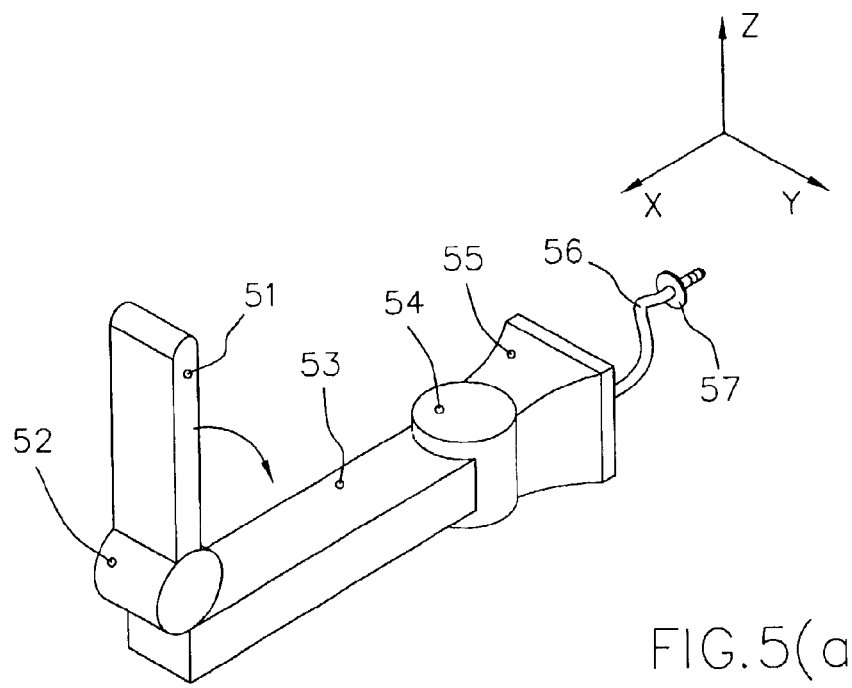
FIG. 5(a) and FIG. 5(b) are schematic views illustrating an antenna assembly for use with a portable computing device in wireless communication according to a fourth embodiment of the invention.
Figure 5B:
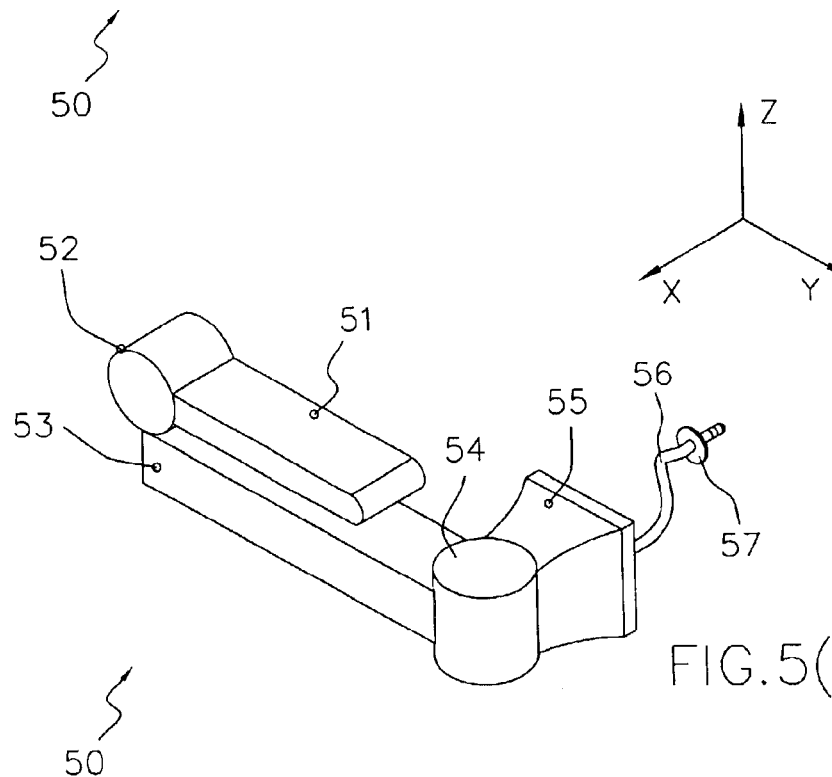

Referring to FIG. 5(a) and FIG. 5(b), two schematic views illustrate an antenna assembly for use with a portable computing device in wireless communication according to a fourth embodiment of the invention. As illustrated in FIG. 5(a) showing a deployed configuration, the antenna assembly 50 of this embodiment comprises an antenna rod 51 that is pivotally connected through a first rotary connection 52 to a traversal arm 53. The traversal arm 53 is pivotally connected through a second rotary connection 54 to a fastening base 55. According to the construction of this embodiment, the rotation axis of the second rotary connection 54 is preferably inclined perpendicular to the rotation axis of the first rotary connection 52. Similar to the previous embodiments, a metallic wire 56 and a fastening screw 57 are provided for transmission and reception of electromagnetic waves. When no wireless transmission or reception is performed, the antenna rod 51 is rotated around the rotation axis Y of the first rotary connection 52 to be folded on the traversal arm 53. Furthermore, the traversal arm 53 can be rotated around the rotation axis Z of the second rotary connection 54 to be folded closely on the side of the portable computer. A convenient retracted arrangement where the antenna assembly is thereby obtained, as illustrated in FIG. 5(b).

As described above, the invention therefore provides an antenna assembly that can be directionally oriented for optimal transmission and reception and, furthermore, can be conveniently retracted closely parallel to one side of portable computing device.

According to a first, second, and third embodiment, the antenna assembly can be retracted via an assembly of a telescopic arm, and directionally oriented via the pivotal mount of an antenna stem to the telescopic arm.

According a fourth embodiment, the antenna assembly can be retracted and directionally oriented for optimal transmission and reception via pivotal mounts of a traversal arm and an antenna stem.

Those skilled in the art will readily appreciate that the above description is only illustrative of specific embodiments and examples of the invention. The invention should therefore cover various modifications and variations made to the herein-described structures and operations, provided they fall within the scope of the invention as defined in the following appended claims.

What is claimed is:

1. An antenna assembly for use with a portable computing device in wireless communication, the antenna assembly comprising:
   a fastening base, connected to one side of the portable computing device;
   an assembly of a plurality of telescopic tubes having a first end and a second end, wherein the first end is movably connected to the fastening base and the telescopic tubes comprises an outer annular flange and an inner annular flange, and an abutment projection, whereby the outer annular flange and inner annular flange respectively that abut against each other preventing the separation of the telescopic tubes, and whereby the abutment projection provided outwardly limiting a relative rotation between the adjacent telescopic tubes;
   an antenna stem, pivotally connected to the second end of the telescopic tubes so that a directional orientation of the antenna stem relative to the telescopic tubes is adjustable by rotation for obtaining optimal transmission and reception; and
   a conductive wire, running respectively along the fastening base, the telescopic tubes, and the antenna stem for transmitting and receiving electromagnetic waves and connecting the fastening base and a wireless network card.

2. The antenna assembly of claim 1, wherein the antenna stem is pivotally connected to the telescopic tubes via a connecting rod that pivotally engages axially with the arm, the antenna stem being inclined relative to the connecting rod, thereby the directional orientation of the antenna stem is adjusted via axially rotating the connecting rod.

3. The antenna assembly of claim 1, wherein the antenna stem is pivotally mounted to the telescopic tubes via a rotary connection, the rotary connection having a pivotal axis that is inclined relative to the axis of the arm, thereby the antenna stem is rotated around the pivotal axis to adjust the directional orientation thereof.

4. The antenna assembly of claim 1, further comprising a fastening screw attached to one end of the conductive wire to connect to the wireless network card.

5. An antenna assembly for use with a portable computing device in wireless communication, the antenna assembly comprising:
   a fastening base connecting to one side of the portable computing device;
   an arm having a first end and a second end and the first end being movably connected to the fastening base in a manner that the arm is capable of retracting close to the side of the portable computing device and deploying away from the side of the portable computing device;
   an antenna stem, pivotally connected to the second end of the arm so that a directional orientation of the antenna stem relative to the arm is adjustable by rotation for obtaining optimal transmission and reception;
   a conductive wire running respectively along the fastening base, the arm, and the antenna stem for transmitting and receiving electromagnetic waves and connecting the fastening base and a wireless network card; and
   a spring mounted within the fastening base and the arm so that one end of the spring is connected to the fastening base, and an opposite end of the spring is connected to the second end of the arm.

6. The antenna assembly of claim 5, wherein the fastening base and the arm comprise a guide groove and a projection respectively that the fastening base locks the telescope tube when the projection is retracted and located within the guide groove.

7. The antenna assembly of claim 5, wherein the antenna stem is pivotally connected to the arm via a connecting rod that pivotally engages axially with the arm, the antenna stem being inclined relative to the connecting rod, thereby the directional orientation of the antenna stem is adjusted via axially rotating the connecting rod.

8. The antenna assembly of claim 5, wherein the antenna stem is pivotally mounted to the arm via a rotary connection, the rotary connection having a pivotal axis that is inclined relative to the axis of the arm, thereby the antenna stem is rotated around the pivotal axis to adjust the directional orientation thereof.

9. The antenna assembly of claim 5, further comprising a fastening screw attached to one end of the conductive wire to connect to the wireless network card.

* * * * *